United States Patent

Wodarz et al.

[11] Patent Number: 5,999,912
[45] Date of Patent: Dec. 7, 1999

[54] DYNAMIC ADVERTISING SCHEDULING, DISPLAY, AND TRACKING

[76] Inventors: Dennis Wodarz, 14403 N. Silverado, Fountain Hills, Ariz. 85268; Donald L. Fairall, 4644 N. 22nd St., Apt 2012, Phoenix, Ariz. 85016; Douglas Hall, 1313 N. Jamaica Way, Gilbert, Ariz. 85234

[21] Appl. No.: 08/850,381

[22] Filed: May 1, 1997

Related U.S. Application Data

[60] Provisional application No. 60/016,674, May 1, 1996.

[51] Int. Cl.[6] .................................................. G06F 17/60
[52] U.S. Cl. ............................. 705/14; 705/26; 705/27; 705/1; 707/511; 707/513; 345/112; 345/121; 345/118; 345/126
[58] Field of Search ............................. 705/14; 395/793, 395/650; 358/402; 707/511, 513; 345/112, 118, 121, 126

[56] References Cited

U.S. PATENT DOCUMENTS

| | | | |
|---|---|---|---|
| 5,442,771 | 8/1995 | Filepp et al. | 395/650 |
| 5,483,466 | 1/1996 | Kawahara et al. | 364/514 |
| 5,572,643 | 11/1996 | Judson | 395/793 |
| 5,664,948 | 9/1997 | Dimitriadis et al. | 434/307 |
| 5,740,549 | 4/1998 | Reilly et al. | 705/14 |
| 5,838,458 | 11/1998 | Tsai | 358/402 |
| 5,848,397 | 12/1998 | Marsh et al. | 705/14 |

*Primary Examiner*—Allen R. MacDonald
*Assistant Examiner*—Jagdish Patel
*Attorney, Agent, or Firm*—Fish & Richardson P.C.

[57] ABSTRACT

Dynamic advertising scheduling, display, and tracking for the world wide web. The invention includes at least one template web page that has conventional HTML codes defining the format and content of the web page. Special "ad tags" are used to indicate the characteristics of an ad that can be displayed on a web page at the position of the ad tag. A request to view a page is sent to a server-resident parser. The parser accesses the template for the requested page, parses the conventional HTML codes, and provides such codes to the user. In addition, the parser "expands" each ad tag to standard HTML code that defines the characteristics of an ad. During expansion of ad tags, the parser determines from each ad tag the type of ad that can be inserted at the page position of the ad tag; a bin identifier defining which ads can be associated with the ad tag; a page identifier of the page associated with the ad tag; and various optional flags and codes. The parser generates a list of valid ads by searching through a conventional database, selects one that fulfills all the parameters of the ad tag, and generates HTML code linking a particular ad to the ad tag. That HTML code is then sent to the user. The parser program can also apply scheduling criteria to select ads from the generated list of eligible candidates.

12 Claims, 3 Drawing Sheets

DYNAMIC ADVERTISING SCHEDULING, DISPLAY, AND TRACKING

This application claims benefit of provisional application No. 60/016,674 filed May 01, 1996.

BACKGROUND OF THE INVENTION

1. Field of the Invention

This invention relates to management of advertising on network systems, particularly for Internet worldwide web pages.

2. Description of Related Art

The worldwide web is an international electronic network comprising a vast number of interconnected electronic sites. The architecture of the worldwide web (simply, "web") includes the use of web "pages" at a site to provide text and graphical information to users accessing that site. Typically, there are only a small number of web pages for a particular site. Many sites are beginning to use advertisements on their web pages in the same way that advertisements have historically been used in other media, such as magazines and newspapers. Typically, the heaviest viewer traffic is on the main page of a site. Accordingly, advertisers generally want to have their advertisements ("ads") displayed on the main page of a web site. This desire can be accommodated by manually periodically changing such ads. However, manual changes are time consuming and costly.

Therefore, the present invention is directed at solving the problems of maximizing the number of advertisers and advertisements on web pages while also maximizing the number of views for each advertiser.

SUMMARY OF THE INVENTION

The invention schedules and rotates available ads for particular pages. The invention includes one or more prototype or template web pages that have conventional hypertext mark-up language (HTML) codes defining the format and content of each web page. In addition, special "ad tags" are used to indicate the characteristics of an ad that can be displayed on a web page at the position of the ad tag. When a user requests a web page to view, the request is sent to a server-resident parser. The server-resident parser accesses the template for the requested page, parses the conventional HTML codes, and provides such codes to the user. In addition, the parser "expands" each ad tag to standard HTML code that defines the characteristics of an ad. The expanded HTML code is transmitted to the user. The HTML code received by the user is converted to a viewable web page by a client-resident HTML browser program, in known fashion.

During expansion of ad tags, the parser determines from each ad tag the type of ad (e.g., banner, button, special, etc.) that can be inserted at the page position of the ad tag; a bin identifier defining which ads can be associated with the ad tag; a page identifier of the page associated with the ad tag; an optional flag permitting the "look and feel" of an ad to be conformed to a desired standard; an optional default ad flag to indicate that any otherwise qualifying ad can be inserted at the page position of the ad tag; and an optional ad ID code to force the association of a particular ad with the ad tag.

With the information from an ad tag, the parser determines what ads are valid for the page containing the ad tag, such as by searching through a conventional database. Each ad is associated with an image (which may include "none") and a network link (for example, by means of a universal resource locator, or "URL", address) to a web page that the viewer would be sent to if the viewer selects ("clicks on") the associated ad. The parser generates a list of valid ads, selects one that fulfills all the criteria of the ad tag, and generates HTML code linking a particular ad to the ad tag. That HTML code is then sent to the user.

The parser program can apply scheduling criteria to select ads from the generated list of eligible candidates, such as: a "least recently viewed" algorithm; random selection; selection based upon time of day; selection based upon user-specific characteristics, such as age, sex, language, etc.; and selection based upon the maximum number of times that an ad has been viewed in a specific time period.

Advantages of the invention are that it maximizes the number of advertisers per web page; it changes ads based upon page number; it tracks the number of times an ad is viewed; it chooses only from eligible ads for each page number; and it makes the entire set of web page for a site more attractive to viewers since changing web pages on the Internet attract more interest than static pages.

The details of the preferred embodiment of the present invention are set forth in the accompanying drawings and the description below. Once the details of the invention are known, numerous additional innovations and changes will become obvious to one skilled in the art.

DETAILED DESCRIPTION OF THE INVENTION

Throughout this description, the preferred embodiment and examples shown should be considered as exemplars, rather than as limitations on the present invention.

Figure 1A:
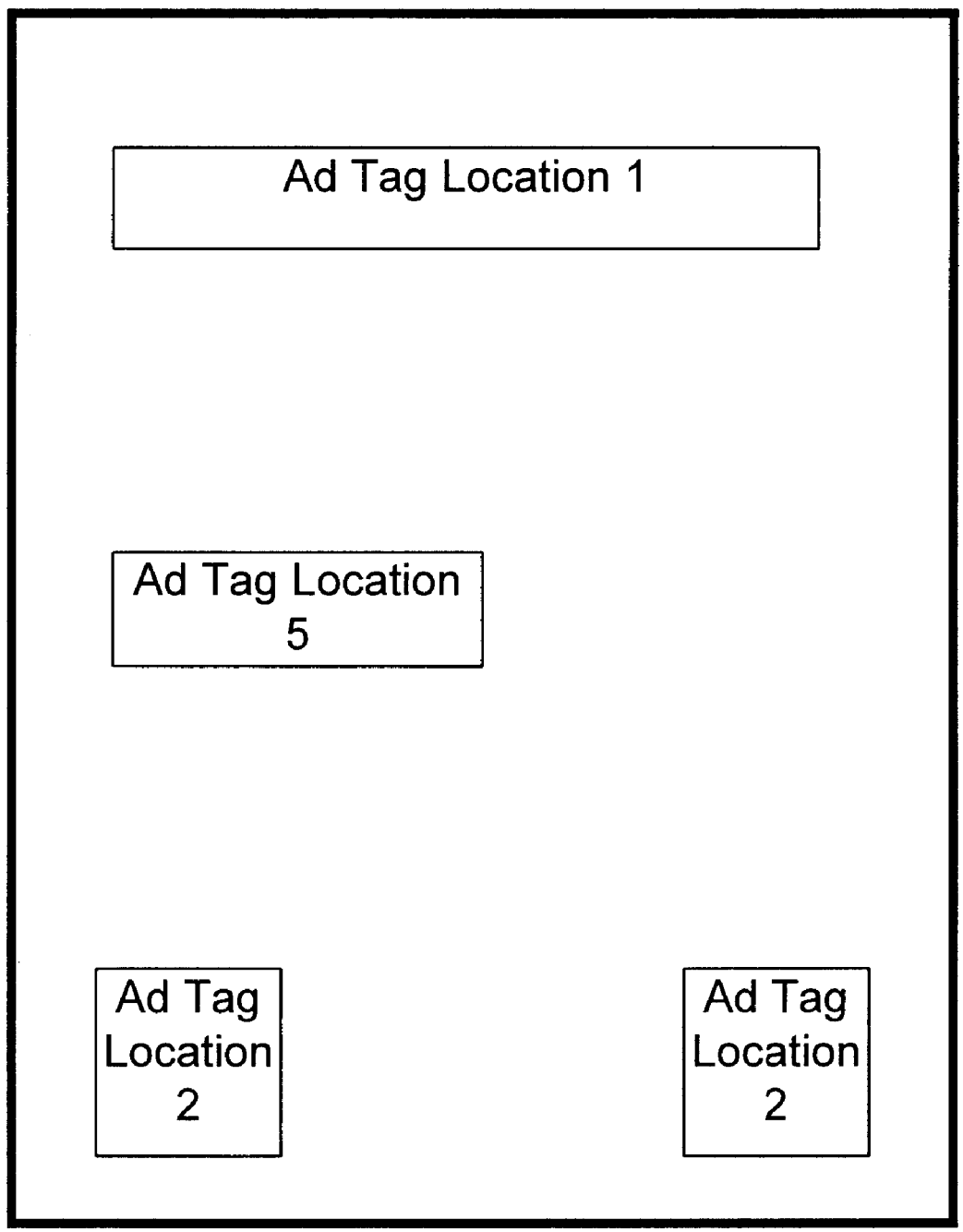
FIG. 1a is diagram of a first web page showing the use of ad tags in accordance with the present invention.
Figure 1B:
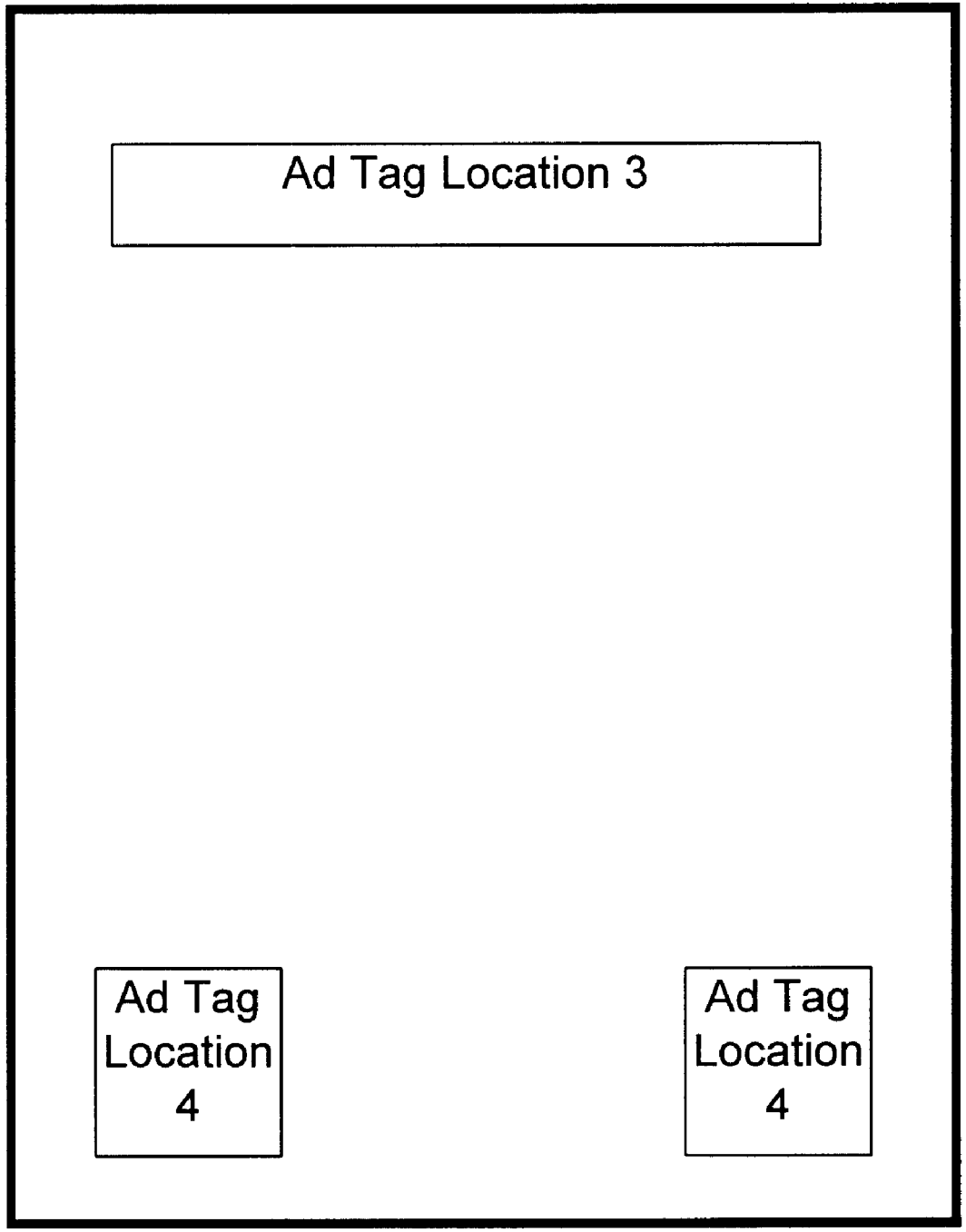
FIG. 1b is diagram of a second web page showing the use of ad tags in accordance with the present invention.

FIGS. 1a and 1b are diagrams of first and second web pages, respectively, showing the use of ad tags in accordance with the present invention. FIGS. 1a and 1b diagrammatically show where an ad will be placed on a viewable web page after the HTML code defining the web page has been parsed by a client viewing program, such as the well-known Netscape program. Shown in the two figures are five possible ad locations, where location 2 and location 4 are replicated such that the associated ad would appear twice on each of the respective pages. It is convenient to associate different "types" with each ad tag location. For example, ad tag locations 1 and 3 may be characterized as "banners" while ad tag locations 2 and 4 may be characterized as "buttons". Ad tag location 5, shown on page 1, can be given type "special", indicating that the associated ad may be any size and any position on the associated web page. Other types may be defined as desired.

Following is a preferred structure for the actual ad tag as it would appear in the HTML code defining a prototype or template page: <!--!viewad type=banner bin=cyberhunt2 loc=riddle-->

The keyword "type" refers to the type of ad (e.g., banner, button, special, etc.) that can be inserted at the page position of the ad tag. The keyword "bin" refers to a class of ads that can be associated with the ad tag. The keyword "loc" refers to the location or page identifier (e.g., page number or name) of the page associated with the ad tag.

Other keywords can be used to define, for example, an optional flag permitting the "look and feel" of an ad to be conformed to a desired standard; an optional default ad flag to indicate that any otherwise qualifying ad can be inserted at the page position of the ad tag; and an optional ad ID code to force the association of a particular ad with the ad tag.

When parsed out by a server-resident parser program, the above ad tag would be expanded, for example, to the following standard HTML code:

<A HREF="/cyberhunt2/pub-bin/gotoad?8961">
<IMG SRC="/advertising/upgrade/upgradebanner1.gif"
ALT="The
Upgrade Group—Click here!" BORDER=0>
</A>

The invention also makes use of a list or database of ads that are candidates for insertion at each ad location specified by ad tags. Following is an example of a table of ads that could be used to fill positions defined by ad tags:

TABLE 1

| Ad Number | Advertiser | Type | Image | Link |
|---|---|---|---|---|
| A | Tracer | 0 | tracer.gif | http://www.tracer.com/ |
| B | Netscape | 0 | ns.gif | http://www.netscape.coml |
| C | Budweiser | 0 | bog.gif | http://www.bud.weiser.corn/ |
| D | Tracer | 1 | huf.gif | http://www.tracer.com/ |

Type 0 = banner, type 1 = button, and type 2 = special.

In the preferred embodiment, a second table is used to associate ad tag locations with ads. The table may be, for example, a simple two-dimensional matrix where ad tag locations are matched to acceptable ads. However, other means of linking ad tag locations to ads can be used, such as be expanding TABLE 1 to include a column of associated ad tag locations.

Figure 2:
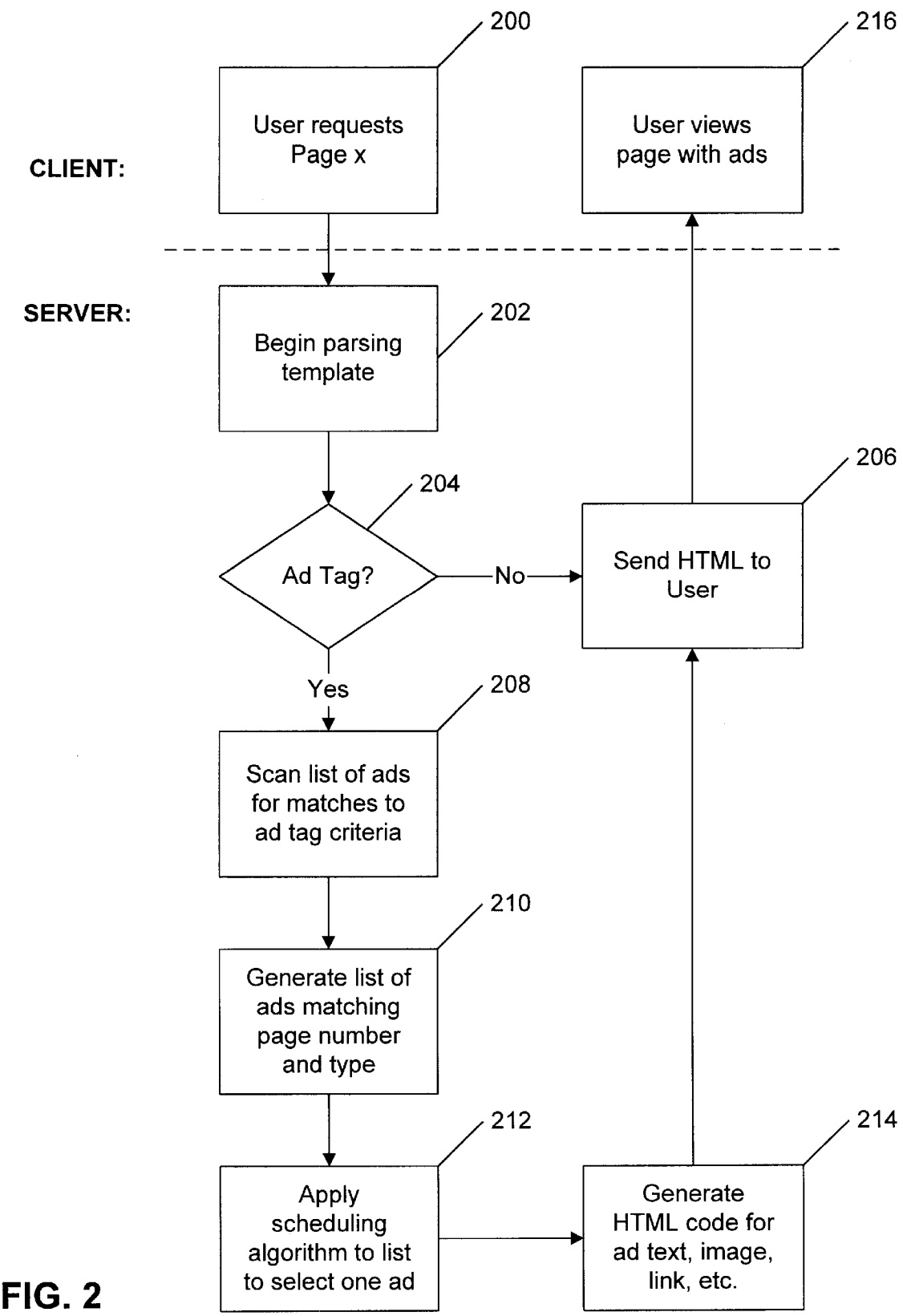
FIG. 2 is a flowchart showing the preferred embodiment of the present invention. Like reference numbers and designations in the various drawings indicate like elements.

FIG. 2 is a flowchart showing the preferred embodiment of the present invention. When a user requests a web page "x" to view (STEP 200), the request is sent to a server-resident parser. The parser accesses the template for the requested page and begins parsing the conventional HTML codes defining the template (STEP 202). As each HTML code is parsed, a determination is made as to whether the code is an ad tag (STEP 204). If not, the HTML codes are sent to the user (as a stream or after buffering a number of codes together to send as a group) (STEP 206).

If an ad tag is found in STEP 204, the parser scans a list or database of ads for ads that match the minimum ad tag criteria of ad type and location (that is, ads that are permitted on a particular web page number) (STEP 208). The parser then generates a list of ads matching the ad type and location information (i.e., page identifier) of the ad tag (STEP 210).

More generally, with the information from an ad tag, the parser determines what ads are valid for the page containing the ad tag. Each ad typically is associated with an image (which may include "none") and a network link (for example, by means of a universal resource locator, or "URL", address) to a web page that the viewer would be sent to if the viewer selects ("clicks on") the associated ad.

The parser program can apply scheduling criteria to select ads from the generated list of eligible candidates (STEP 212). A variety of scheduling algorithms can be used, such as: a "least recently viewed" algorithm; random selection; selection based upon time of day; selection based upon user-specific characteristics, such as age, sex, language, etc.; and selection based upon the maximum number of times that an ad has been viewed in a specific time period. For this latter function, the server keeps a count of the number of times an ad is viewed in a selected time period (e.g., a day), in known fashion.

Upon selection of an ad to associate with an ad tag, the parser "expands" the ad tag to standard HTML code that defines the characteristics of the ad (STEP 214). This is done in general by substituting, in place of the ad tag, the link and image information from the database entry for the selected ad. The expanded HTML code is then transmitted to the user (STEP 206).

The HTML code received by the user is converted to a viewable web page by a client-resident HTML browser program, in known fashion (STEP 216).

As an example, using TABLE 1 above and FIGS. 1*a* and 1*b*, the following schedule could be defined:

Ads A, B, C are associated with ad tag location 1
Ads A, B are associated with ad tag location 3
Ad D is associated with ad tag locations 2 and 4

If a user requests page 1, any of ads A, B, and C could appear at ad tag location 1, and ad D would appear at both ad tag locations 2; no ad or a default ad would appear at ad tag location 5. If a user requests page 2, any of ads A and B could appear at ad tag location 3, and ad D would appear at both ad tag locations 4. Ad C would never appear on page 2.

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described above and generate output information. The output information is applied to one or more output devices, in known fashion.

Each program is preferably implemented in a high level procedural or object oriented progrmming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

What is claimed is:

1. A method for dynamically scheduling and displaying advertising on world wide web pages, comprising the steps of:

(a) receiving in a server computer a request from a client computer for a web page;

(b) accessing coded information defining the requested web page;

(c) determining if the coded information includes ad tags, each ad tag defining an associated location on the web page for an advertisement and characteristics of advertisements that may be displayed at such location;

(d) for each determined ad tag:
   (1) scanning a set of one or more advertisements for advertisements that match the characteristics defined in such ad tag;
   (2) selecting one such matching advertisement to display at the location associated with such ad tag;
   (3) generating web page code that defines display and linkage characteristics for the selected advertisement; and
   (4) sending the generated web page code from the server computer to the client computer for display by a browser program.

2. The method of claim 1, wherein each ad tag defines an associated advertisement type.

3. The method of claim 1, wherein each ad tag specifies an associated web page.

4. The method of claim 1, wherein the generated web page code comprises hypertext mark-up language code.

5. The method of claim 1, wherein the step of selecting one such matching advertisement to display at the location associated with such ad tag includes selecting such advertisement based on one of: such advertisement having been selected least recently; random selection; time of day; user-specific characteristics; and the maximum number of times that such advertisement has been viewed in a specific time period.

6. The method of claim 1, further including the step of tracking the number of times each selected advertisement is viewed in a selected time period.

7. A computer program, residing on a computer-readable medium, for dynamically scheduling and displaying advertising on world wide web pages, comprising instructions for causing a computer to:

(a) receive in a server computer a request from a client computer for a web page;

(b) access coded information defining the requested web page;

(c) determine if the coded information includes ad tags, each ad tag defining an associated location on the web page for an advertisement and characteristics of advertisements that may be displayed at such location;

(d) for each determined ad tag:
   (1) scan a set of one or more advertisements for advertisements that match the characteristics defined in such ad tag;
   (2) select one such matching advertisement to display at the location associated with such ad tag;
   (3) generate web page code that defines display and linkage characteristics for the selected advertisement; and
   (4) send the generated web page code from the server computer to the client computer for display by a browser program.

8. The program of claim 7, wherein each ad tag defines an associated advertisement type.

9. The program of claim 7, wherein each ad tag specifies an associated web page.

10. The program of claim 7, wherein the generated web page code comprises hypertext mark-up language code.

11. The program of claim 7, wherein the instructions for causing a computer select one such matching advertisement to display at the location associated with such ad tag includes instructions for causing the computer to select such advertisement based on one of: such advertisement having been selected least recently; random selection; time of day; user-specific characteristics; and the maximum number of times that such advertisement has been viewed in a specific time period.

12. The program of claim 7, further including further including instructions for causing the computer to track the number of times each selected advertisement is viewed in a selected time period.

* * * * *